(12) United States Patent
McVaugh

(10) Patent No.: US 6,604,707 B2
(45) Date of Patent: Aug. 12, 2003

(54) STEERABLE POWER TUG FOR SMALL AIRCRAFT

(76) Inventor: Arthur K. McVaugh, Box 800, Green La., PA (US) 18054

( * ) Notice: Subject to any disclaimer, the term of this patent is extended or adjusted under 35 U.S.C. 154(b) by 0 days.

(21) Appl. No.: 10/226,574

(22) Filed: Aug. 23, 2002

(65) Prior Publication Data

US 2003/0116676 A1 Jun. 26, 2003

Related U.S. Application Data

(63) Continuation-in-part of application No. 10/034,314, filed on Dec. 26, 2001.

(51) Int. Cl.$^7$ ............................................... B64C 25/50
(52) U.S. Cl. ....................................... 244/50; 180/19.2
(58) Field of Search ........................ 244/50, 51, 114 R, 244/115; 180/19.1, 19.2, 19.3, 11, 12, 904

(56) References Cited

U.S. PATENT DOCUMENTS

| | | | | |
|---|---|---|---|---|
| 2,920,845 A | * | 1/1960 | Palmiter | 180/19.3 |
| 3,150,734 A | * | 9/1964 | Duggar, Jr. | 180/11 |
| 3,662,911 A | * | 5/1972 | Harman | 414/430 |
| 4,280,578 A | * | 7/1981 | Perkins | 180/6.5 |
| 4,289,212 A | * | 9/1981 | Immel | 180/19.1 |
| 4,915,185 A | * | 4/1990 | Olson | 180/19.2 |
| 5,860,622 A | * | 1/1999 | Weibert | 244/50 |

FOREIGN PATENT DOCUMENTS

| | | | | |
|---|---|---|---|---|
| GB | 2193935 A | * | 2/1988 | B62D/51/04 |

* cited by examiner

Primary Examiner—Peter M. Poon
Assistant Examiner—Timothy D. Collins
(74) Attorney, Agent, or Firm—John S. Munday

(57) ABSTRACT

A tug device for moving small aircraft having front wheels. A portable drill is connected to a drive wheel and a frame is attached to the wheel. The device is steerable, having a wheel mounted on a vertical set of pins such that the wheel is pivotable about the axis of the pins to permit turning the wheel on that axis and steering the tug while operating the drive mechanism.

24 Claims, 19 Drawing Sheets

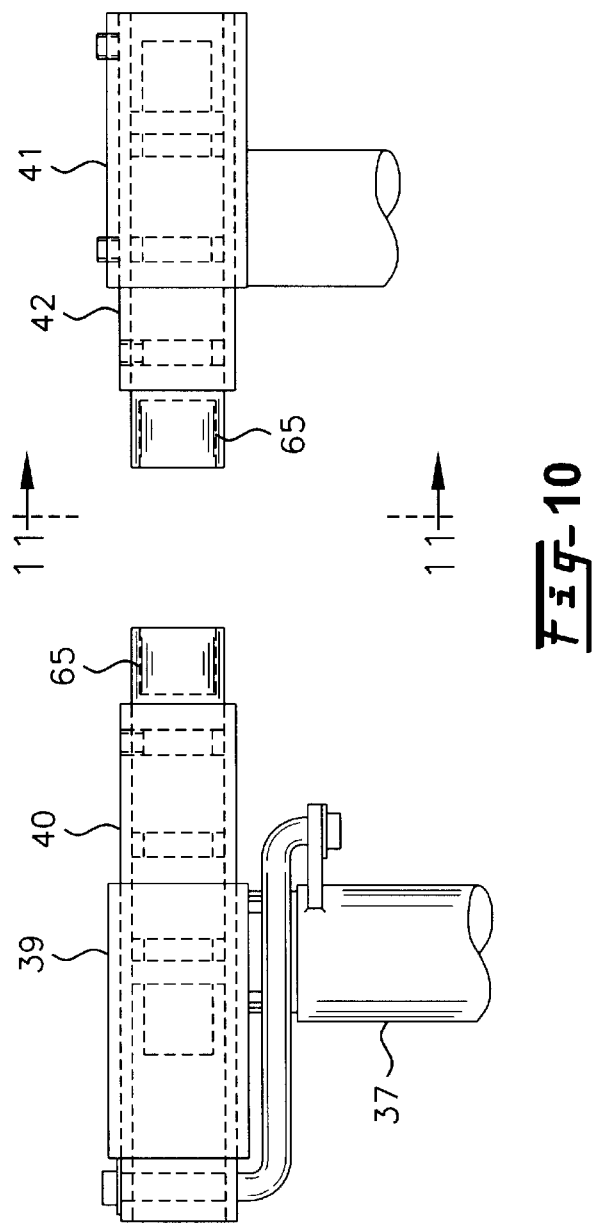
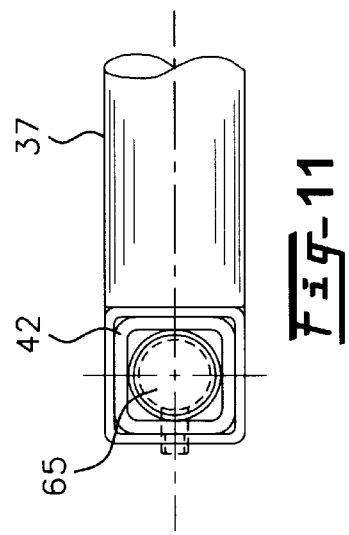

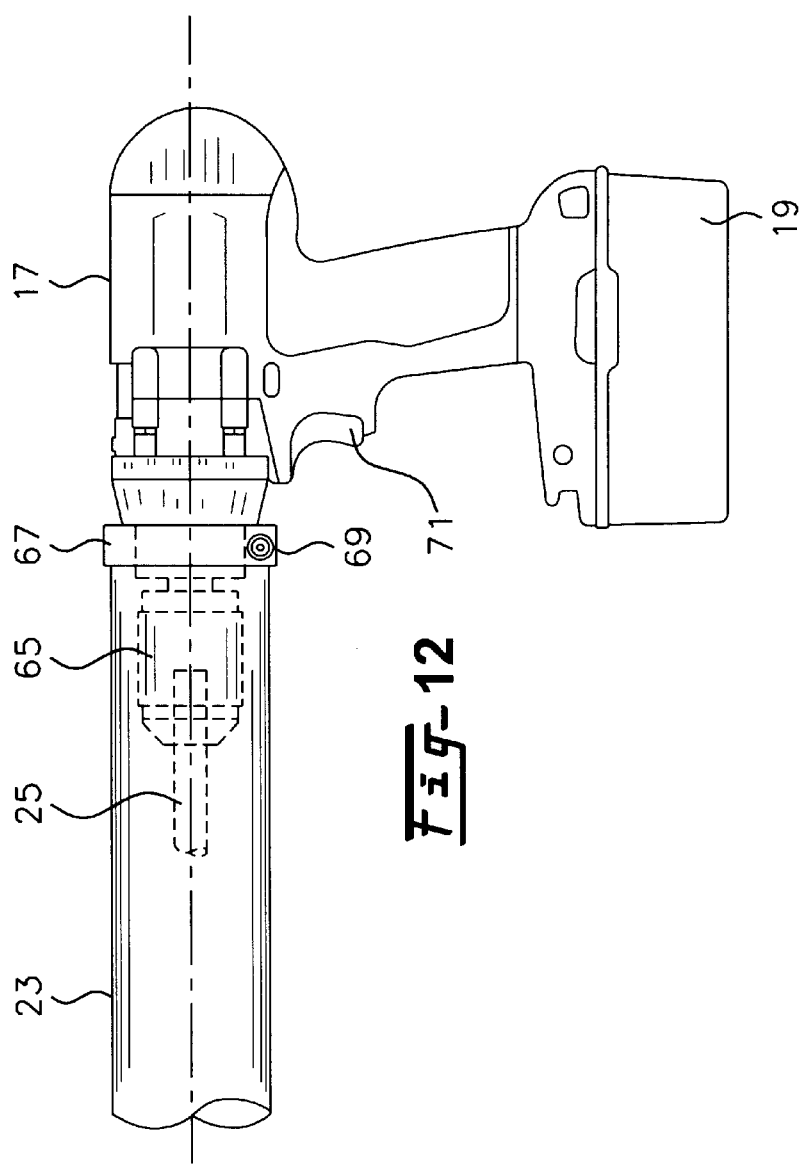
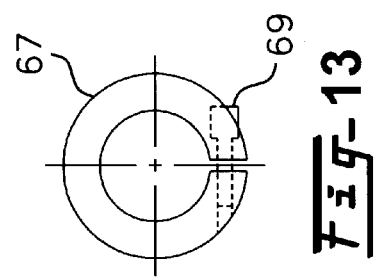

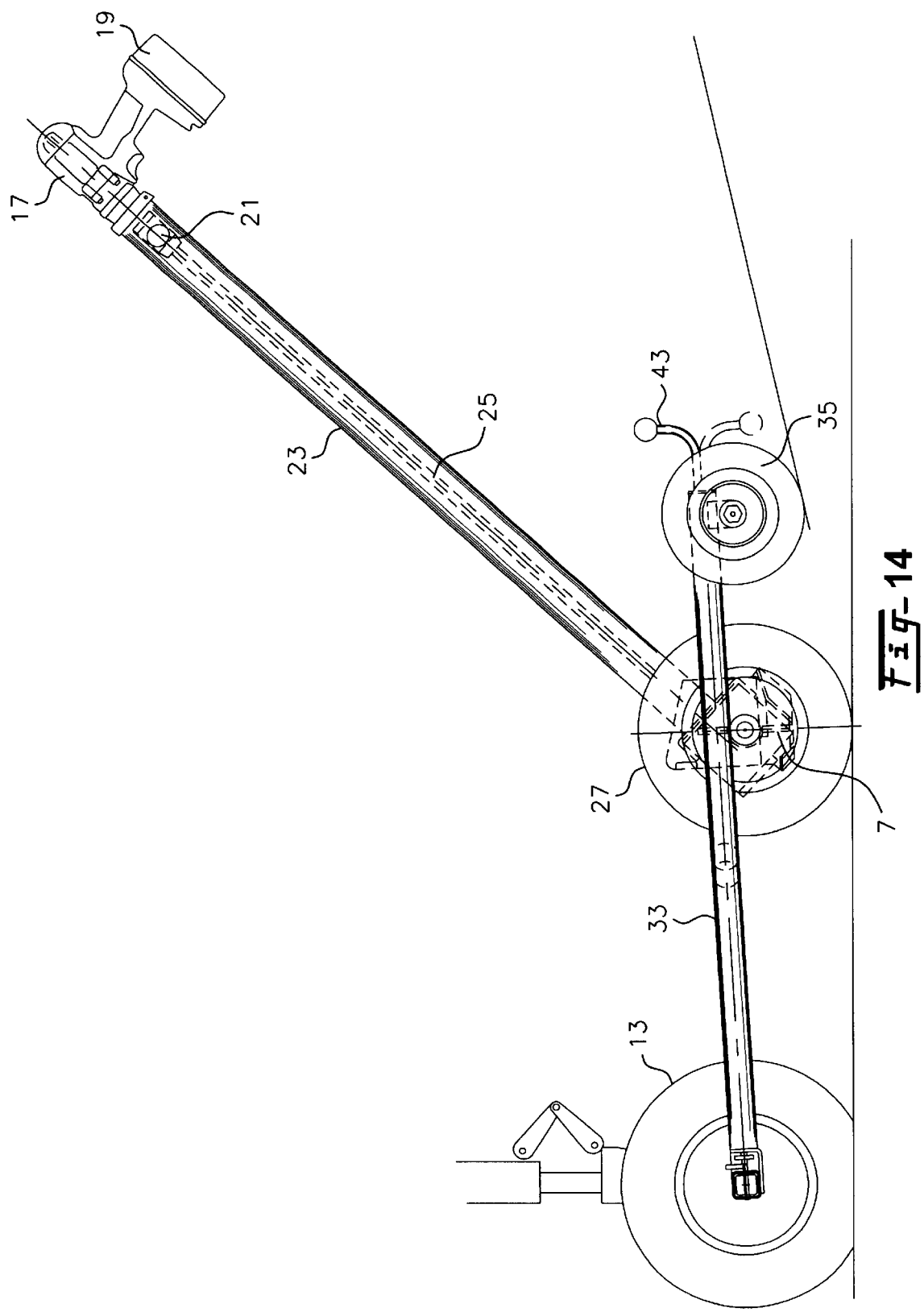

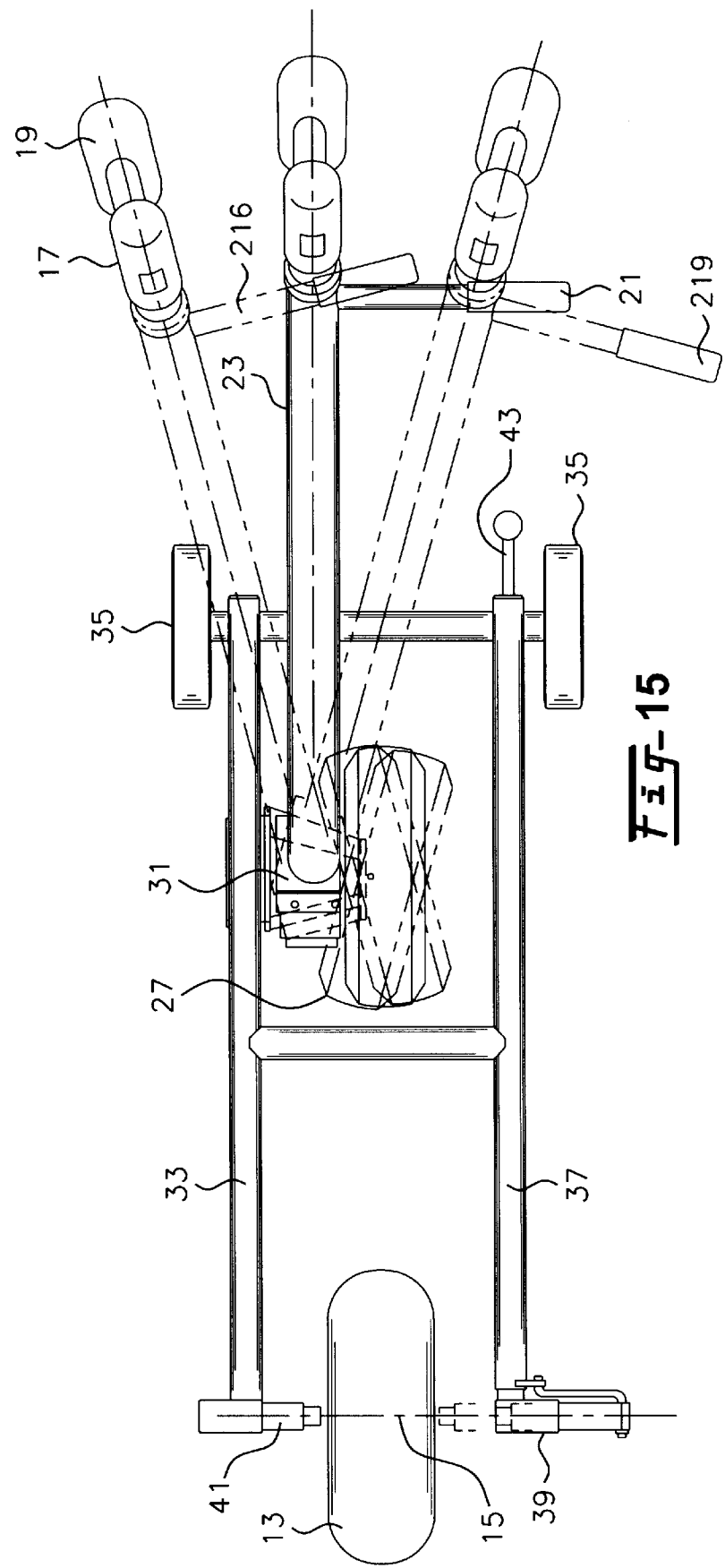

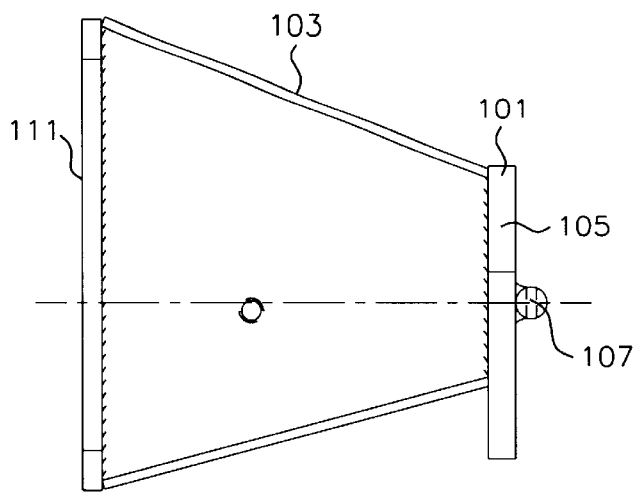
_Fig_-16
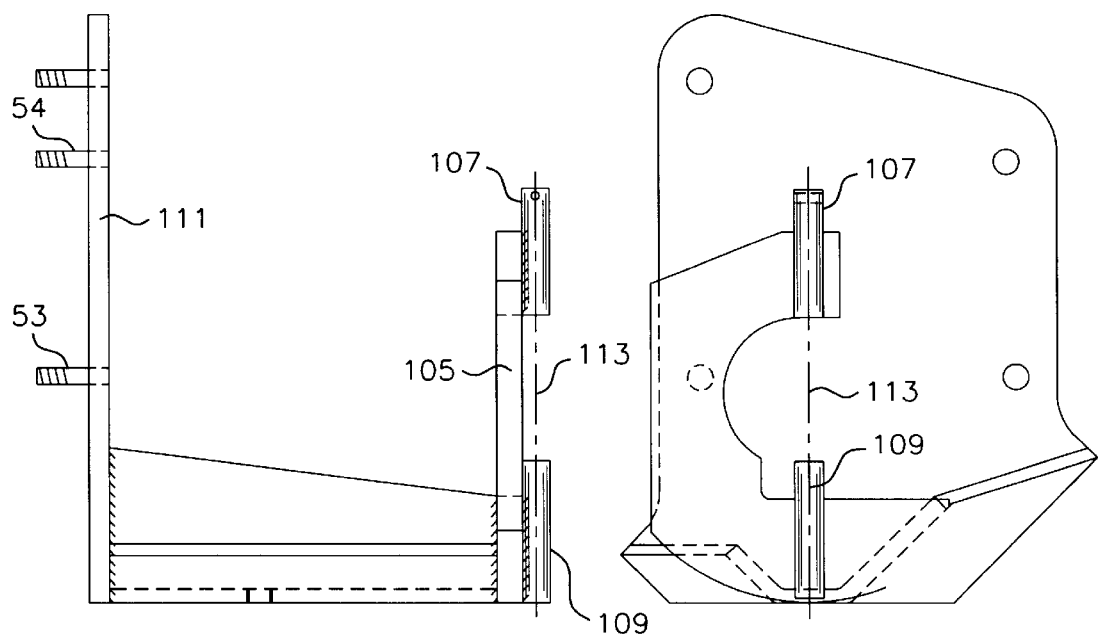
_Fig_-17  _Fig_-18

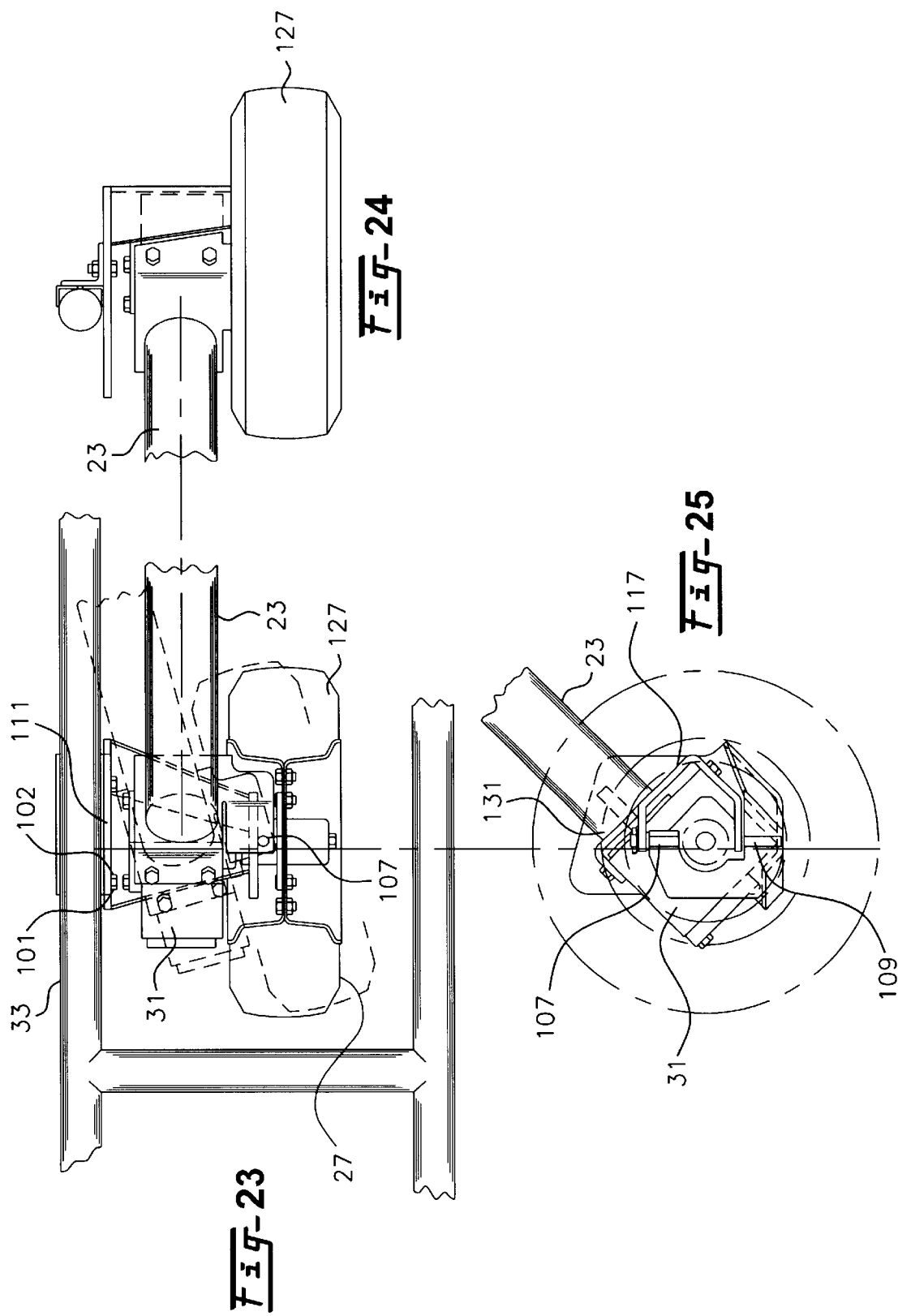

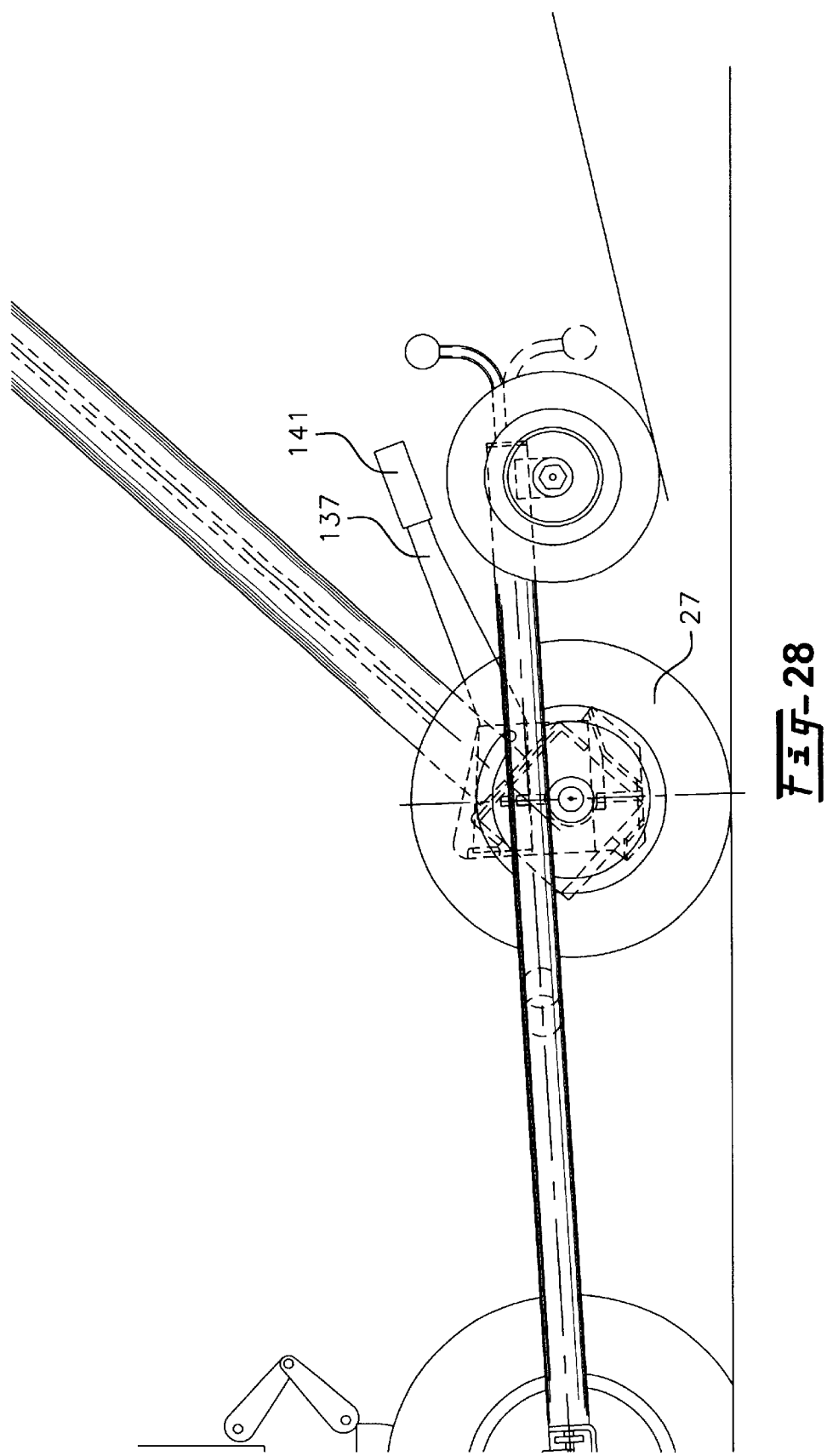

STEERABLE POWER TUG FOR SMALL AIRCRAFT

This is a continuation-in-part of my prior application entitled POWER TUB FOR SMALL AIRCRAFT, filed Dec. 26, 2001, having Ser. No. 10/034,314, pending.

FIELD OF THE INVENTION

The present invention relates to a power tug for moving small aircraft at airports and the like. More particularly the present invention relates to a power tug using a commercially available portable electric drill to drive a gear and wheel assembly capable of rapid attachment to small aircraft front wheel axles and nose struts. The present embodiment is steerable.

BACKGROUND OF THE INVENTION

Moving small aircraft on the ground is often necessary when the aircraft is serviced or taken to a hanger or brought out. In the past, the motor has been started and the aircraft's own power has moved it from one place to another. This, of course, presents a potential danger from the rotating propeller. It also produces unnecessary wear and stress on the motor when it is operated for just a short while.

As an alternative, aircraft tugs have been employed, much like the large tugs that move commercial jet aircraft and the like. However, this requires a significant investment in equipment costs for operating the tug. It also requires having someone available to operate the device and/or train small aircraft owners to use the machine.

It would be of great advantage if a simple, efficient device could be developed that would permit owners to move their own planes without worrying about safety concerns from the motor of the plane.

One such device has been proposed. Olson U.S Pat. No. 4,915,185 discloses a portable aircraft moving device using a portable electric drill. The drill output shaft is linked to a worm gear to mount temporarily to the front wheel of the airplane above the airplane wheel. While the drawings of this patent are clearly not intended to be to scale, the size of the airplane and the operator distort the difficulties of moving aircraft that may weigh several thousand pounds. Olson requires a drive wheel in the device to engage the aircraft front wheel and use that wheel to push or pull the aircraft. One additional drawback of Olson is that it places frictional stress on the nose wheel. It is not adaptable to all aircraft, requiring a specific axle adapter for each make or model.

Other patents have also found use for portable electric drills. Hawgood U.S Pat. No. 4,156,315 discloses a dolly for maneuvering trailers, again using a worm gear.

Perkins U.S Pat. No. 4,280,578 teaches the use of an electric drill for a walker for the disabled, a far less substantial weight and effort than aircraft. Perkins also uses a worm gear arrangement.

Finally, Hurt U.S Pat. No. 3,713,501 employs an electric drill to alternatively move a belt to elevate the hand truck up or down stairs or move the wheel axle of the hand truck on flat ground. None of these other devices suggest a simple, effective method for moving small aircraft without frictional engagement with the nose wheel of the aircraft and without having separate fittings for each make or model of the plane being moved.

In my copending continuation-in-part, a solution to the problems of the prior are is described and claimed. This invention improves on my prior invention by modifying the design, to make the device steerable, producing substantial advantages including the ability to move much heavier aircraft because of the steerable features.

Other advantages will appear hereinafter.

SUMMARY OF THE INVENTION

It has now been discovered that the above and other objects of the present invention may be accomplished in the following manner. Specifically, the present invention provides a tug for moving small aircraft, usually single engine, on the ground while the motor of the airplane is off.

The tug device includes two parts that are fastened together prior to use, in one or more orientations depending on the specific aircraft being taxied. One component comprises a power transmission column having a battery powered drill having a variable output, mounted on the upper end of the column and a drive wheel at the other end. A drive shaft engages the drill and a speed reducing gear box to drive the unit. The unit is steered by movement of a handle on the column.

The second component comprises a frame having a first and second end defining a generally u-shape configuration. A fixed position trunion mounted on the first end of the frame for engagement with an aircraft. A rotating engaging member is mounted on the other end of the frame, the engaging member having an engaging trunion for engagement with an aircraft. A control member is provided for moving the engaging trunion into and out of engagement with the aircraft. Dolly wheels are on the frame for free wheeling the unit.

The unit is assembled using a connector mount for connecting the frame to the power column to position the fixed position trunion and engaging trunion in position to engage an aircraft in at least one position. In the preferred embodiment, there are two positions so that the tug can work on open front or nose wheels and a second position for engagement with the wheel strut when the wheel is covered, such as with a faring.

Finally, the device includes a pivot means tucked into the hollow cavity of the wheel without changing the general overall appearance of the tug of this invention. A supporting structure between the pivot pin and the main frame is located underneath a gearbox speed reducer. The steerable feature is accomplished using an independent arm piece as described hereinafter.

BRIEF DESCRIPTION OF THE DRAWINGS

For a more complete understanding of the invention, reference is hereby made to the drawings, in which:

FIG. 10 is a top view showing the trunions in position to engage an aircraft wheel;

FIG. 11 is an end view of the device on the right of FIG. 10;

FIG. 12 is a side elevational view of the power element of the present invention;

FIG. 13 is a front view of the device shown in FIG. 12;

FIG. 14 is a side elevational view, partially cut away, showing the preferred embodiment in use with an aircraft wheel, with portions shown in dot and dash lines;

FIG. 15 is a top view of the device of FIG. 14, showing the ability to turn the wheel and steer the tug;

FIG. 16 is a top view of a support structure for supporting a drive wheel on the device of this invention;

FIG. 17 is a side elevational view of the device of FIG. 16;

FIG. 18 is a front elevational view of the device of FIG. 17;

FIG. 23 is a top view of the device of this invention in which the bracket and support structures of FIGS. 14 and 19 are mounted on the device of this invention, with an alternative position for the drive wheel shown in dot and dash lines;

FIG. 24 is an enlarged view of the bracket and support structure mounting the drive wheel;

FIG. 25 is a side elevational view showing the bracket and supports structure, with the wheel in dot and dash line; FIGS. 27 and 28 illustrate the locking arm of FIG. 26 in place on the preferred embodiment.

DETAILED DESCRIPTION OF THE PREFERRED EMBODIMENT

Figure 1:
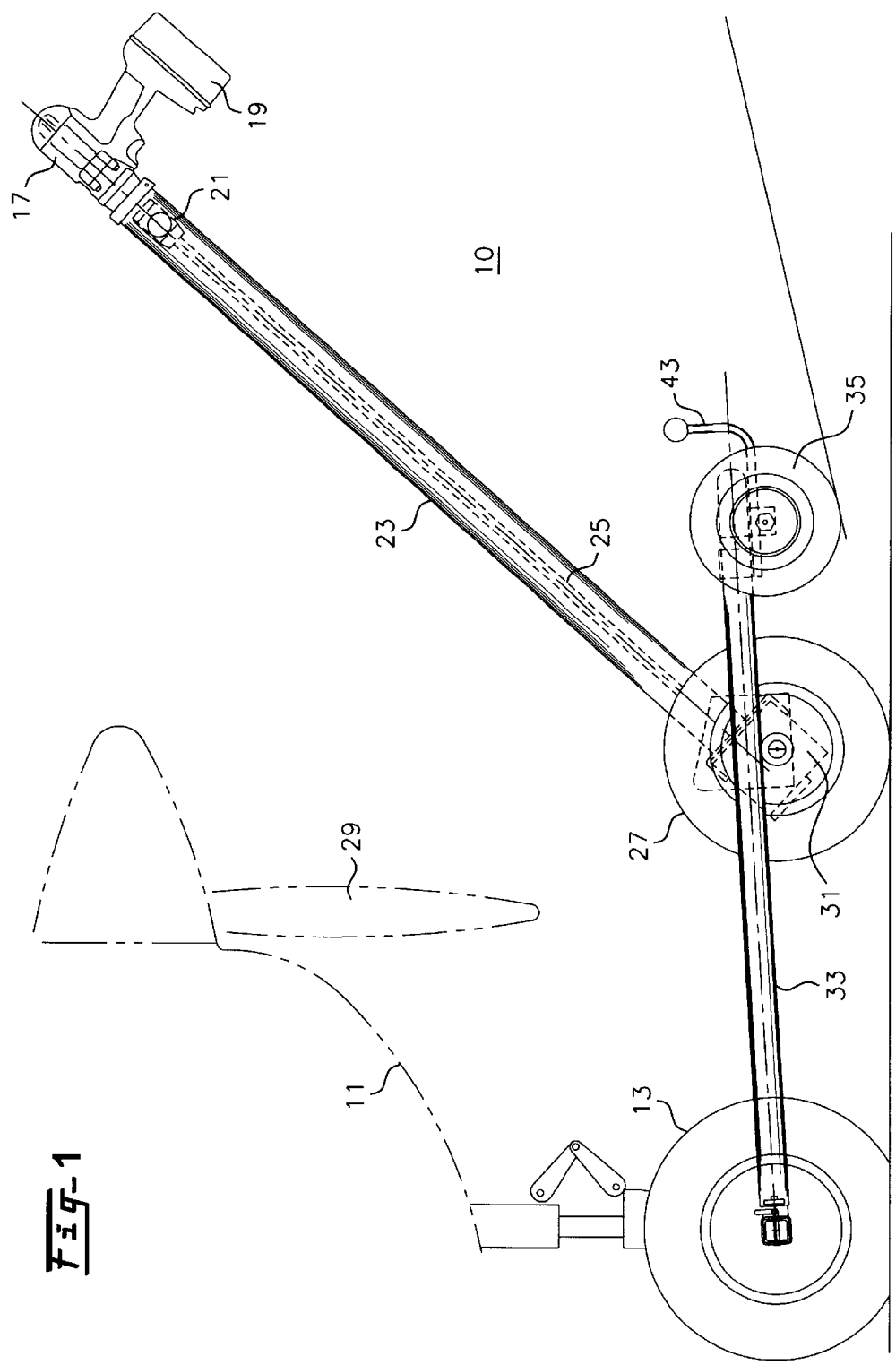
FIG. 1 is a side elevational view, partially cut away, showing the preferred embodiment in use with an aircraft shown in dot and dash lines.
Figure 2:
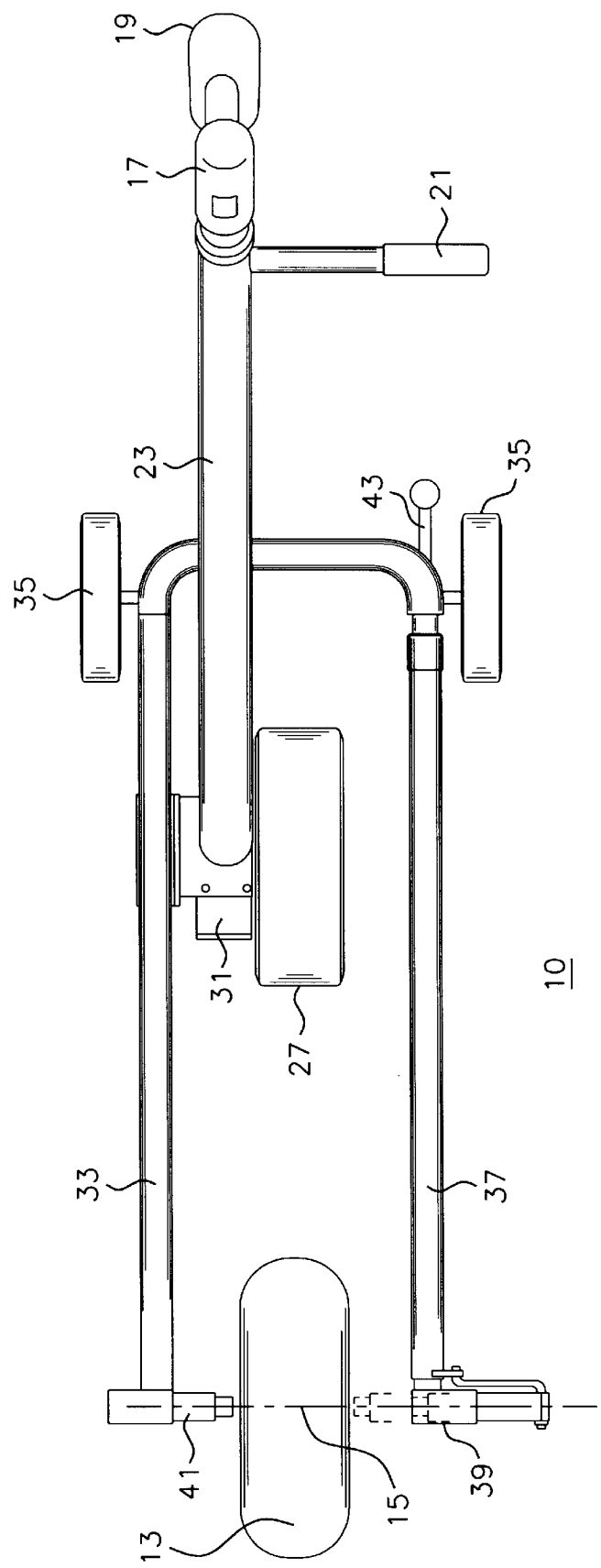
FIG. 2 is a top view of the device of FIG. 1.

As shown in the drawings, particularly FIGS. 1 and 2, the present invention provides a device 10 generally for use with an airplane 11 having a front wheel 13 supported on a front axle 15. Aircraft of any make or model weight less than about 3,000 pounds are suitable for use with the power tug of this invention. The tug includes a battery powered conventional electric drill 17, with rechargeable battery 19, for providing a suitable variable speed power source.

The preferred electric drill is a cordless 18-volt battery operated drill, having a quick release battery that snaps in place. A spare battery can be carried on the device.

The device includes a handle 19 for directional control of the device which is attached to the tubular power column 23. Column 23 includes a drive shaft 25, shown in dashed lines in FIG. 1, which communicates with drive wheel 27 to allow the device to be positioned near airplane 11 while propeller 29 is not operating, allowing a safe movement of plane 11 drive wheel is operated by drive shaft 25 and worm gear speed reducer 31, allowing drive wheel 27 to rotate in either direction, to push or pull aircraft 11.

A tubular frame 33 is attached to the drive shaft 25 and drive wheel 27 via simple connecting point, described below, which permits the unit to be separated into two major parts or components. Tubular frame 33 supports dolly wheels 35, which permit free wheeling movement of the unit when it is not attached to an aircraft.

Tubular frame 33 also includes a rotating engaging tube 37 for locking the tug to the airplane. Engaging tube 37 includes an engaging trunion 39 which is used to engage the aircraft axle 15 after fixed position trunion 41 has engaged the other side of axle 15. An aircraft engaging control lever 43 is foot operated to pivot engaging trunion 39 on to axle 15.

Figure 3:
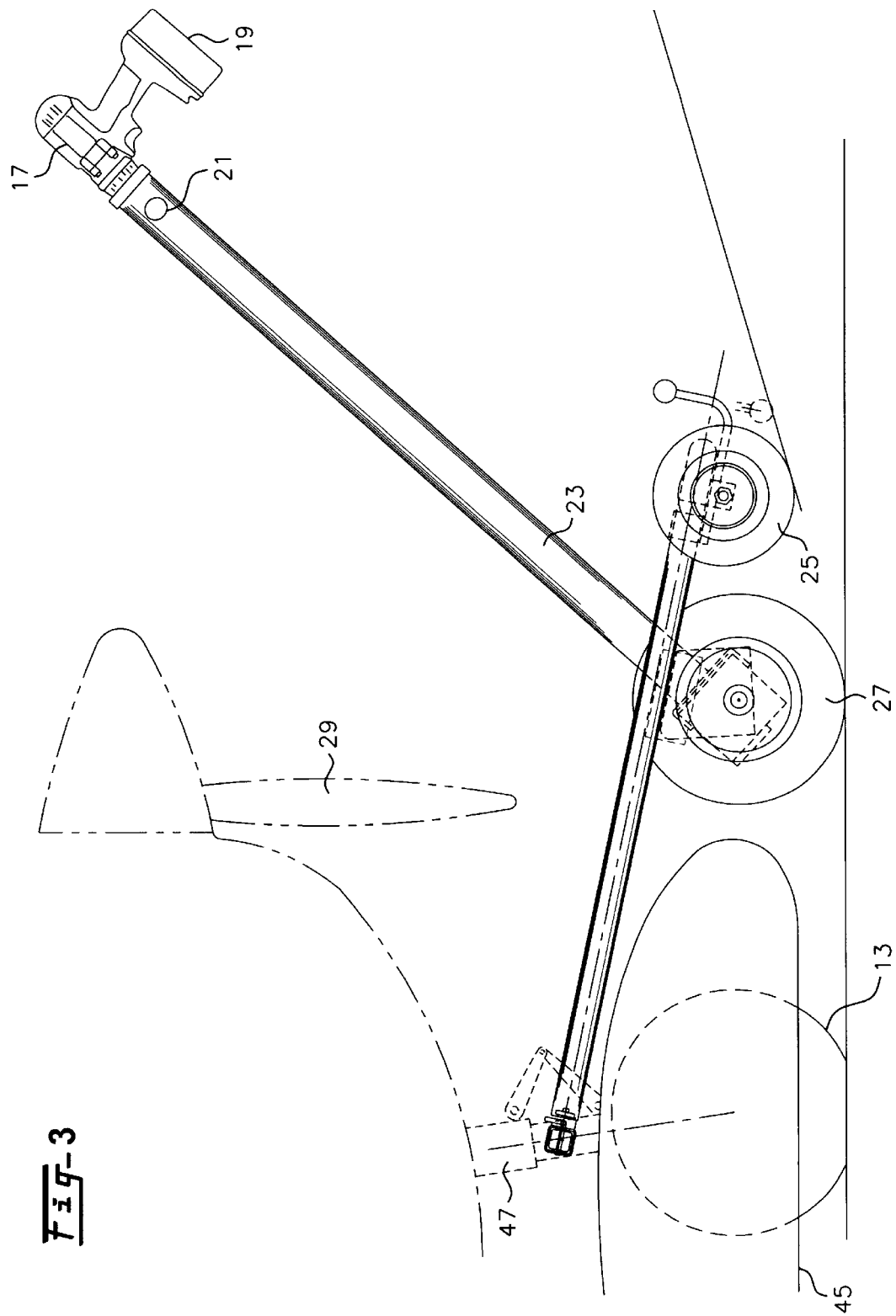
FIG. 3 is a side elevational view of the device of FIG. 1, in use with an alternative type of aircraft wheel.
Figure 4:
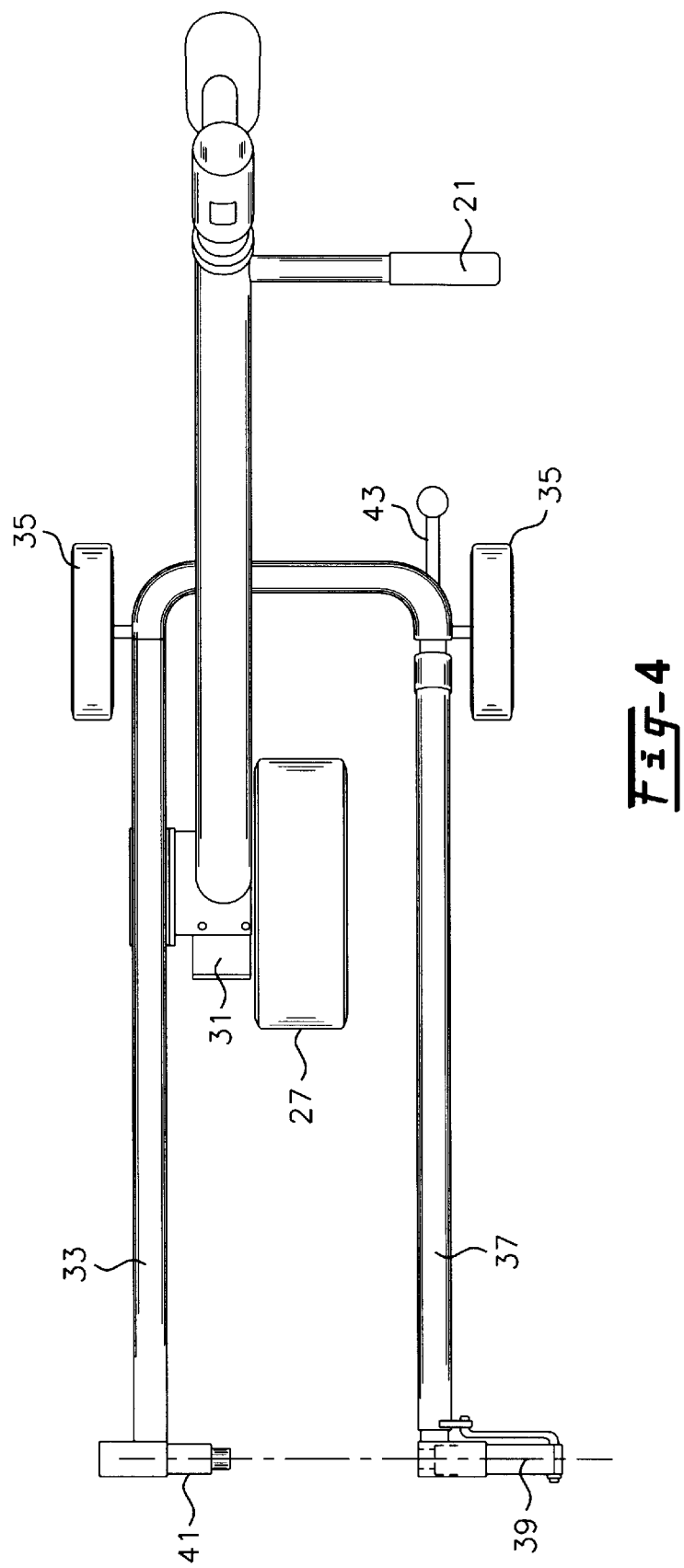
FIG. 4 is a top view of the device of FIG. 3.

FIGS. 3 and 4 illustrate an alternative use of the present invention with aircraft having enclosed front wheels 45 so that the engageable trunion 39 and fixed trunion 41 engage the airplane nose gear strut 47 tubular frame 33 is attached to the power column 23 and drive wheel 27 at a different angle or position, shown in FIG. 3.

Figure 5:
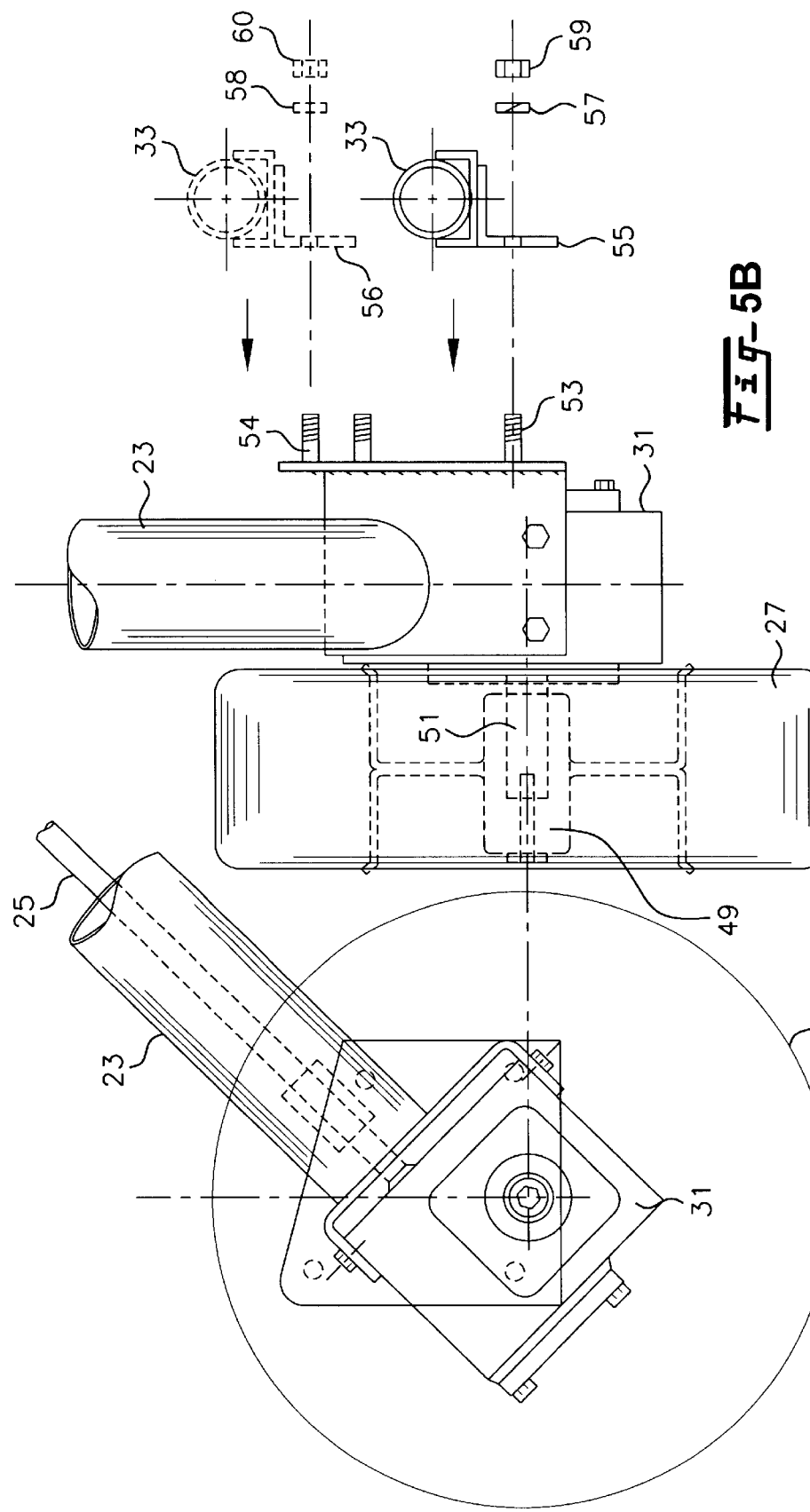
FIGS. 5A and 5B are detail views of the method of attachment of the frame to the power column in two configurations.
Figure 6:
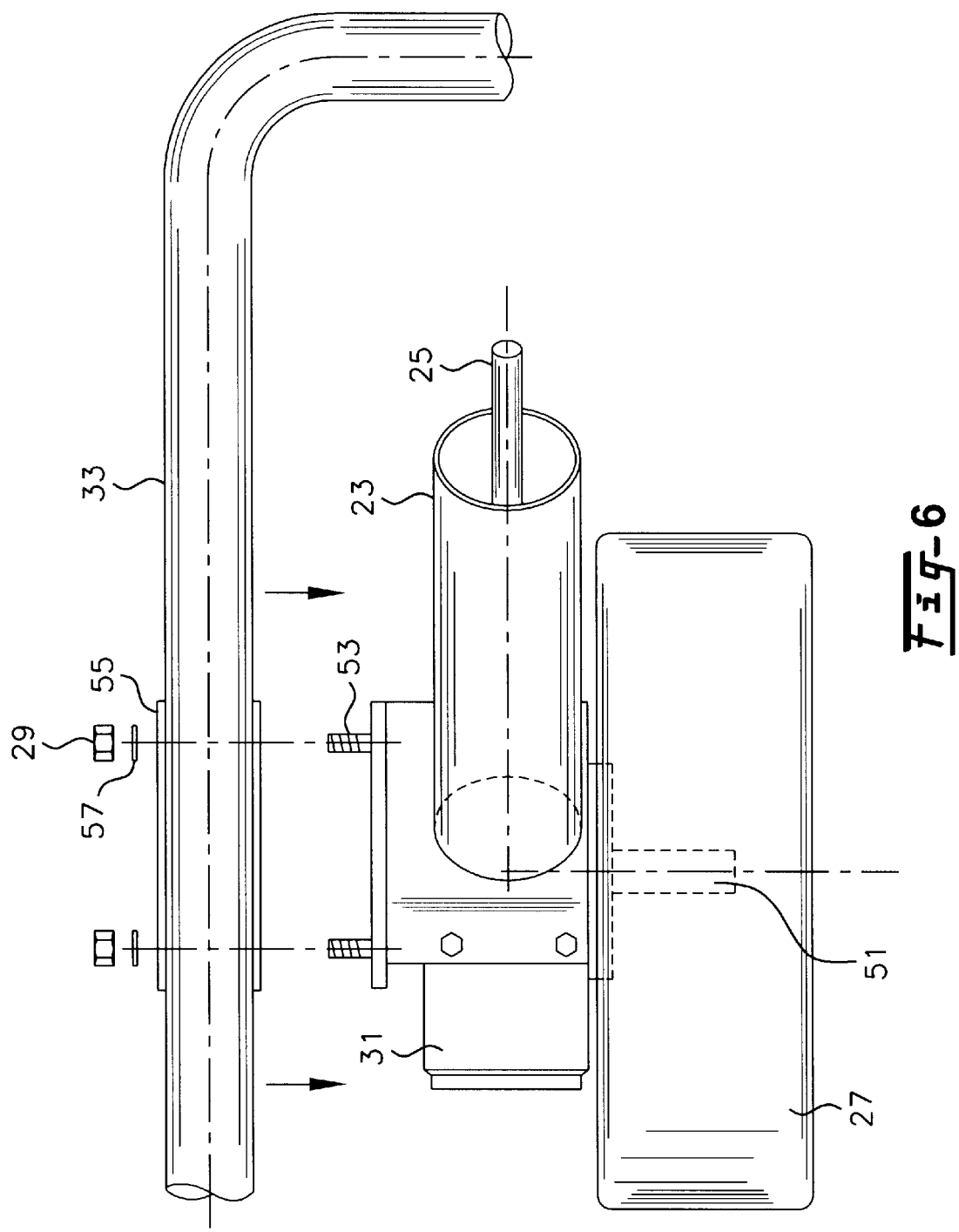
FIG. 6 is detail view illustrating the attachment of the frame to the power column in one configuration.

Frame 33 and power column 23 are joined using the attachment means shown in FIGS. 5A, 5B and FIG. 6. FIG. 5A is a side view of the power column 23 and worm gear box 31, also showing drive shaft 25. In FIG. 5B, drive wheel 27 includes a wheel to shaft attaching hub 49 and driven shaft 51. Worm gear box 31 is mounted on driven shaft 51, and the gear box 31 also includes bolts 53 for bracket 55 for attachment in the orientation shown in FIGS. 1 and 2, using lock washers 57 and hex nuts 59. Alternatively, shown in dot and dash line in FIG. 5B, bolts 54 are used with bracket 56, lock washer 58 and hex nut 60 for attachment in the orientation shown in FIGS. 3 and 4.

Figure 7:
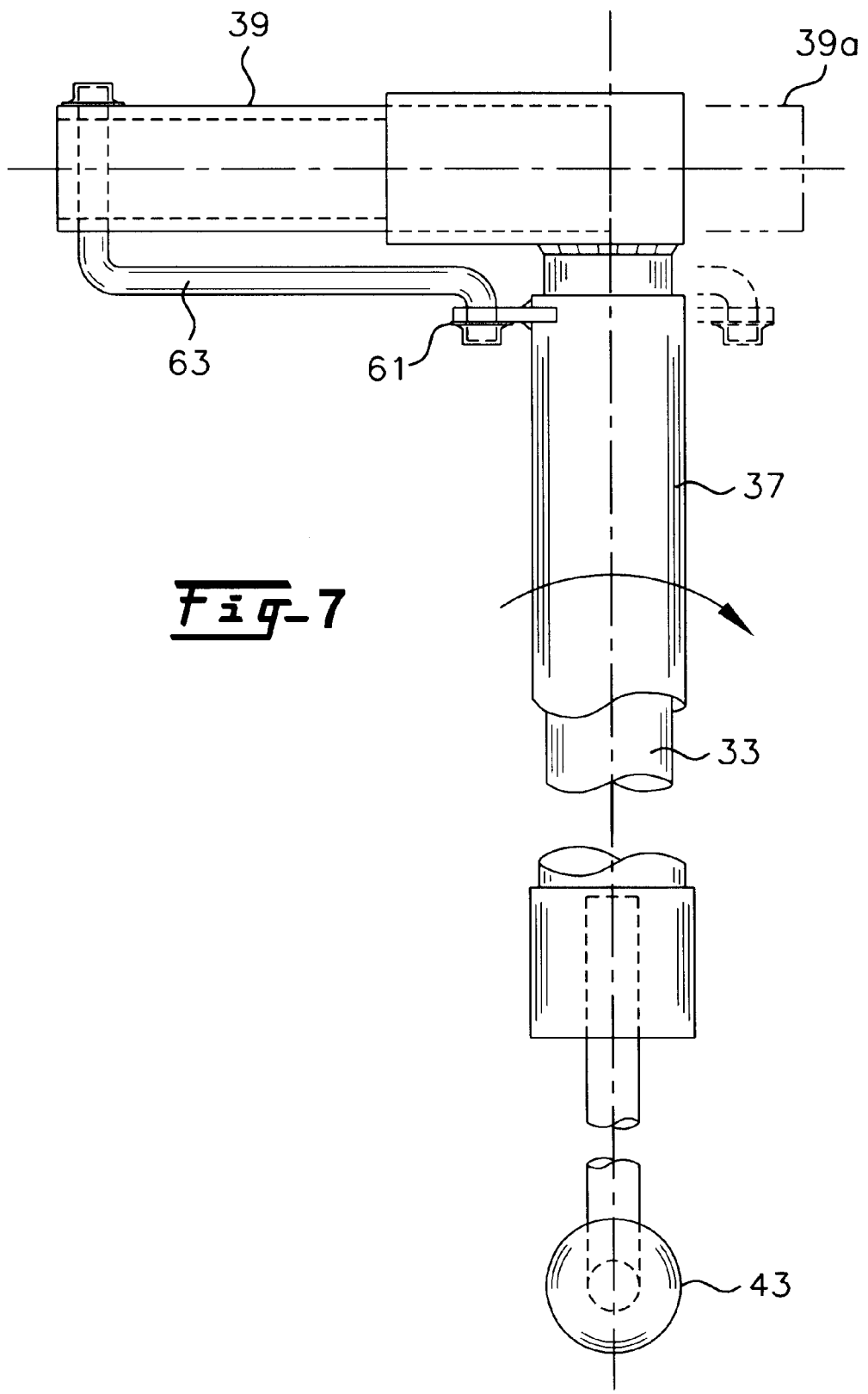
FIG. 7 is a detail view of the operation of the engagement trunion of the invention, with some components illustrated in dot and dash lines.
Figure 8:
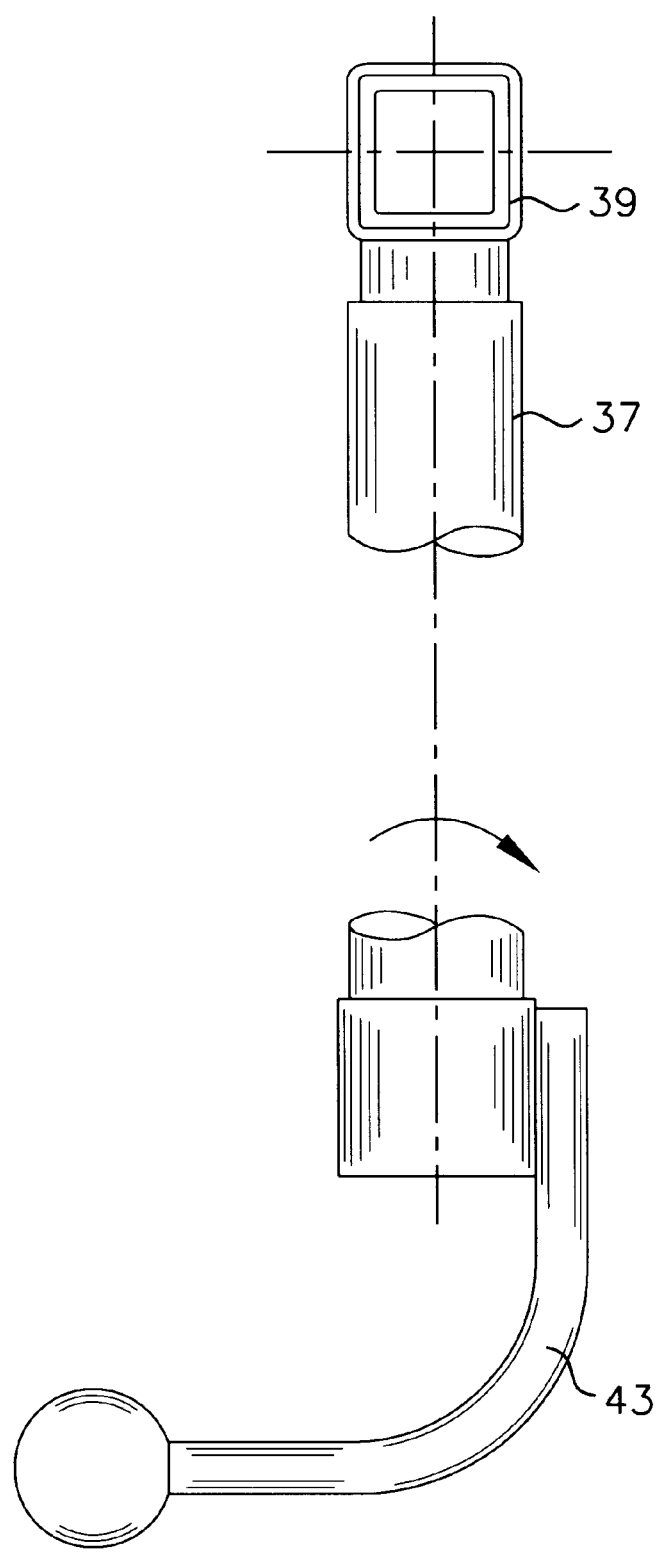
FIG. 8 is a detail view of the locking engagement mechanism for the engaging trunion.
Figure 9:
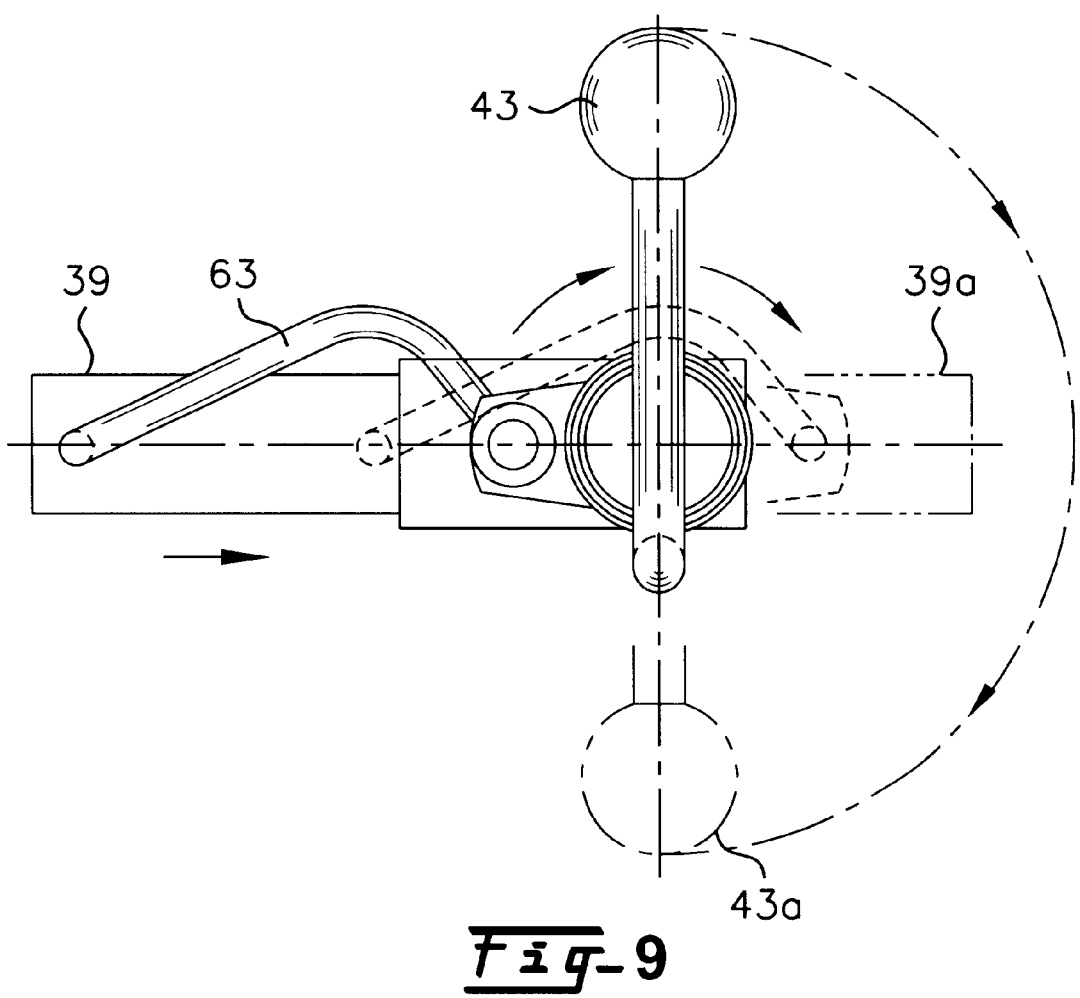
FIG. 9 is a side view illustrating the device shown in FIG. 8.
Figure 19:
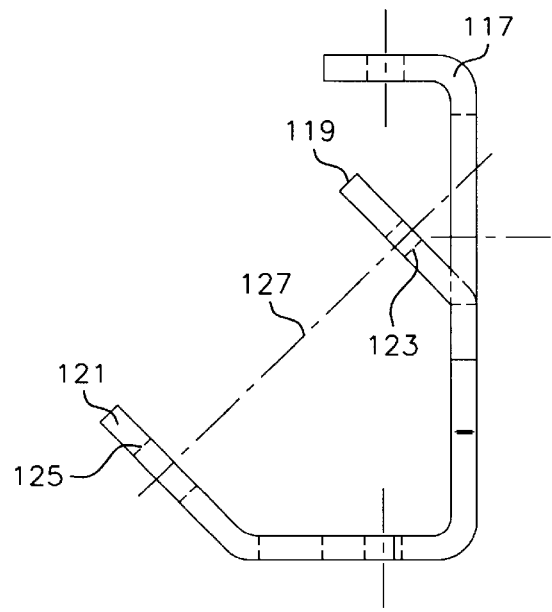
FIG. 19 is a side elevational view of a mounting bracket for attachment to a drive wheel on the device of this invention.
Figure 20:
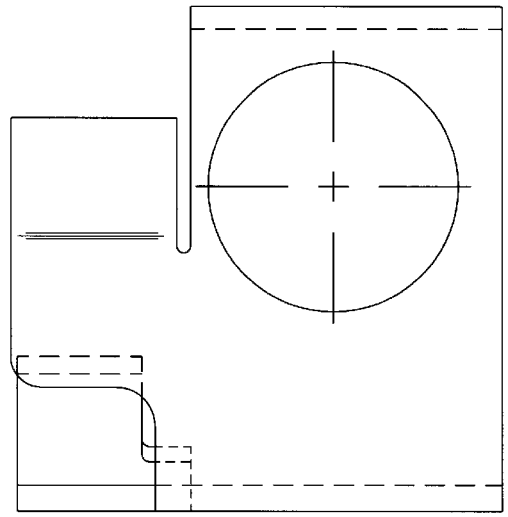
FIG. 20 is a top view of the bracket of FIG. 19.
Figure 21:
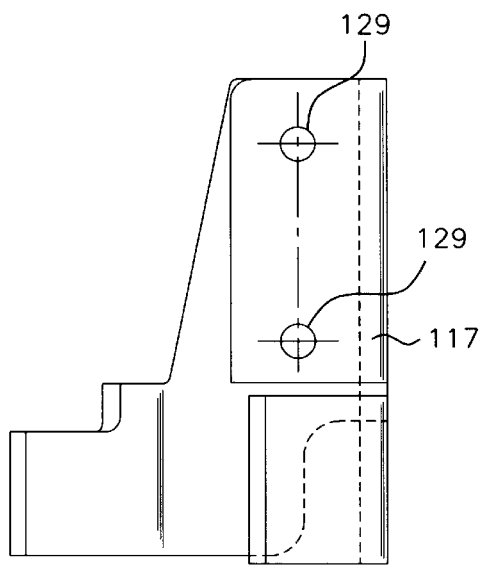
FIG. 21 is a front elevational view of the bracket of FIG. 19.
Figure 22:
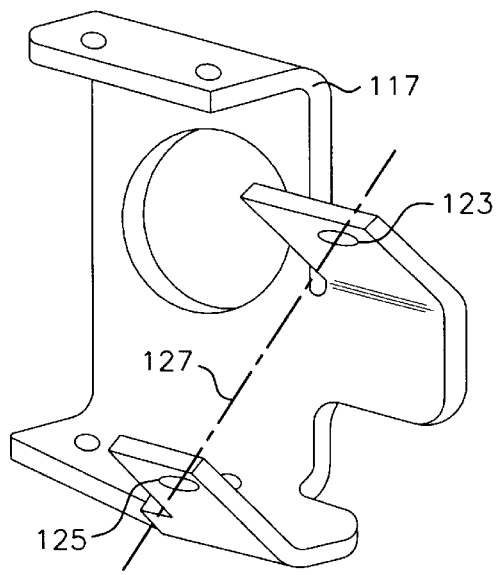
FIG. 22 is a perspective view of the bracket of FIG. 19.

FIGS. 7, 8 and 9 illustrate the preferred engagement mechanism for attachment to the axle 15 or aircraft strut 47, depending on the particular airplane being towed by the tug device of this invention. Stationary tube 33 is enclosed by rotating engaging tube 37, shown in FIG. 7 as both are partially cut away. Engaging tube 37 includes a bracket 61 for holding link 63, which moves engaging trunion 39 about the axis of rotating engaging tube 37 for engagement with the axle 15 or strut 47 as described below.

FIG. 8 illustrates the way aircraft engaging control lever 43 is rotated to cause trunion 39 to be pivoted about that axis. FIG. 9 illustrates the control lever 43 in the engaged position, so that trunion 39 is, for example, engaged with axle 15, not shown in this figure. Movement of control lever 43a to the position shown in dot and dash lines moves link 63, and therefore trunion 39 away from the axle to the position shown, also seen as dot and dash lines in FIG. 7. The arrows illustrate the direction of movement of the components shown in these figures. Engagement is easy and secure, and an operator can use his or her foot to move control lever between the two positions.

FIG. 10 illustrates sliding engaging trunion 39 in greater detail and shows additional details of fixed position trunion 41, both of which are shown as square tubular stock 40 and 42 respectively. Adapters 65 are fitted on tubular stock 40 and 42. The airplane is then put in position, such as that of FIGS. 1 and 2, for example, so that axle 15 is first engaged by adapter 65 on stock 42, so that when sliding engaging trunion 39 is moved as described above, adapter 65 on tubular stock 40 also engages axle 15. FIG. 11 illustrates one end of adapter 65 mounted on stock 42, taken along lines 11—11 of FIG. 10. The unit is ready to move the aircraft.

FIGS. 12 and 13 illustrate the attachment and/or removal and replacement of cordless electric drill 17, if, for example, drill 17 should fail. In most commercially available drills, such as the ones shown here, battery 19 can be removed for recharging and, if desired, a spare battery could be used while charging the first such battery. It is important to note that the drill 17 may also be a corded drill connected to a power source. This feature permits movement of a large number of airplanes in a confined area where the tub does not have to go farther than a long extension or power cord. Drill 17 includes a drill chuck 65 which engages drive shaft 25, shown in dot and dash line in FIG. 12. A split collar 67 is welded to tubular power column 23 and fitted with a clamping screw 69 to mount the drill 17 firmly to the column 23. Pressure on trigger 71 causes shaft 25 to rotate in either direction, depending on the rotation direction selected on drill 17, so that shaft rotates to drive wheel 27 through a conventional worm gear speed reducer 31, seen in FIG. 1, for example.

Once the wheel 13 of an aircraft has been engaged, drill 17 moves drive wheel as desired, as fast or as slow as necessary, so that the aircraft can be brought to or from its parking location, or maintenance hanger. Handle 21 allows the device to be steered, providing excellent maneuverability.

The tug device of the present invention has been tested on a number of small aircraft. Tests have shown that the tug device is capable of moving a 3000 pound airplane in and out of hangers with no strain or noticeable effort. One fully charged battery will continuously move an aircraft for at least ⅛ mile at two feet per second. There is no need to bend or stoop, since the control lever 43 is foot controlled, snapping from an engaged position to a disengaged position and back.

Since different airplane manufactures have different front wheel designs, the trunions are easily changed as desired in minutes. The cordless driver is intended to be a name brand drill that can be serviced at thousands of tool service centers, and can be removed and replaced in seconds. Since the drive wheel 27 is engaged with the gear box and drive shaft at all times, the drill acts as a positive brake for safe control on grades. Because there is full time engagement on the nose strut of the airplane, either on the nose wheel or the strut itself, there is no loss of control of the aircraft while in motion. The ability to attach and detach the frame to the power column allows for easier storage and for positioning the trunions for the two common forms of front airplane wheel assemblies gives the tug of this invention universal applicability.

Turning now to FIGS. 14–25, the improved steerable feature of the present invention is shown, in which like numbers identify the same elements as in FIGS. 1–13 as described herein above. The device in FIG. 14 looks like the device shown in FIG. 1, for example, attached to an aircraft wheel 13 such that the drill 17 drives drive shaft 25 through worm gear reducer 31 to move the aircraft forward or back. Drill 17 may be a cordless battery powered drill or it may be driven by a power cord attached to a power supply. FIG. 15 illustrates the operation of the steerable features of the present invention, where drive wheel 27 is shown in solid line going straight and in dot and dash line turning to the sides to steer the aircraft. Again, the drill 17 drives the drive wheel but now movement of handle 21 to the left,: 21*a*, or right, 21*b*, permits much greater control of the aircraft.

The drive wheel steering mechanism includes two components. A support bracket 101, shown in FIGS. 16–18, includes an angular arm 103, a pivot plate 105, on which pivots 107 and 109 are mounted. Adapter plate 111 is used to mount the bracket 101 to tube frame 33, as shown in FIG. 23. Support bracket 101 aligns pins 107 and 109 in a vertical axis 113 when the bracket 101 is mounted on tube frame 33. This axis 113 will become the axis about which the drive wheel 27 will turn.

The second component if the drive wheel steering mechanism is a mounting bracket 117, shown in FIGS. 19–22, and includes a first angled member 119 and a second angled member 121, which contain first hole 123 and second hole 125 respectively. Holes 123 and 125 are centered on an axis 127, which is at an angle shown in FIG. 22, but which becomes vertical and concentric with axis 113 when the bracket 117 is mounted on power column 23 via bolts through bolt holes 129. FIG. 25 illustrates bracket 117 mounted to power column 23.

FIGS. 23–25 also illustrate the manner in which support bracket 101 supports mounting bracket 117 by passing pins 107 and 109 through holes 123 and 125, such that axis 113 and axis 127 become concentric. Wheel 127 is shown in dot and dash line in FIG. 23, to permit the illustration of the relationship between support bracket 101 on tube 33 via bolts 102 and mounting bracket 117 on power column 23 by permanent attachment via weldment 131. Of course, other fastening means may be used instead of bolts, such as studs, weldments and the like for fastening both support bracket 101 and/or mounting bracket 117 to the device of this invention.

In operation, the improved steerable power tug for small aircraft has shown significant advances in movement of such small planes on the ground. With the steerable feature, maneuvering is significantly improved. Moreover, it has been surprisingly discovered that heavier and larger aircraft can be moved with the tug of this invention. In one test, a Cesna Citation, a twin engine plane weighing about 4,000 pounds, was moved easily, whereas the non-steerable device was designed for aircraft up to about 3000 pounds.

Figure 26:
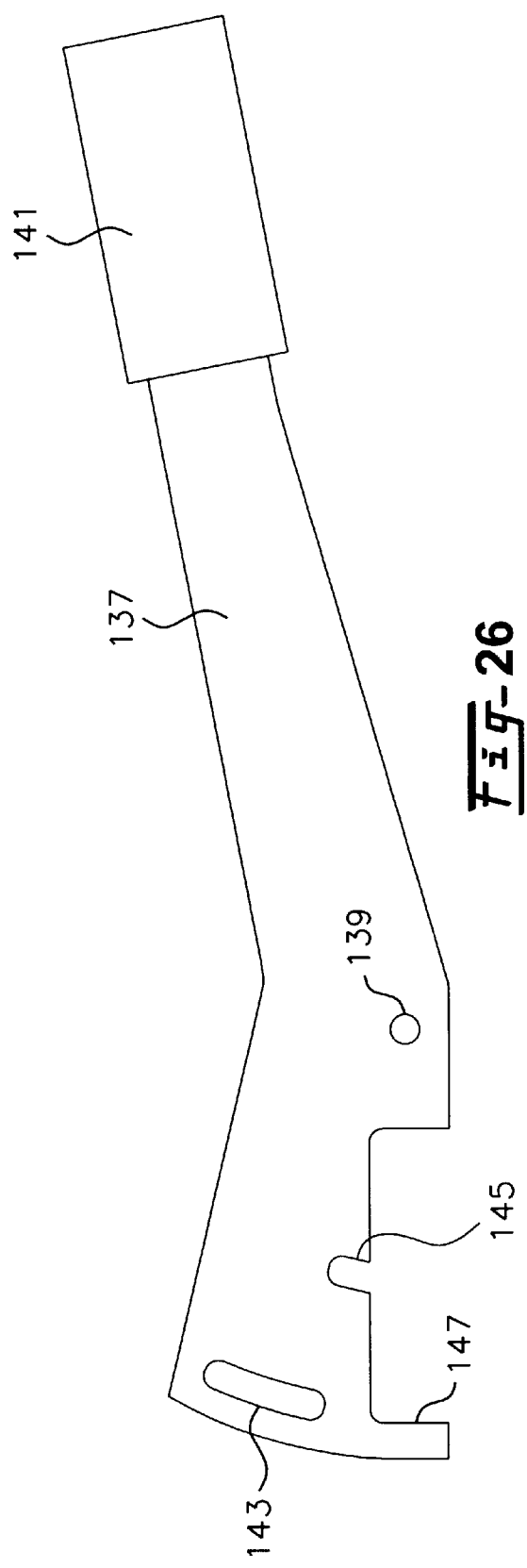
FIG. 26 is a side elevational view of the locking arm claimed in claims 6, 12, 18 and 23.
Figure 27:
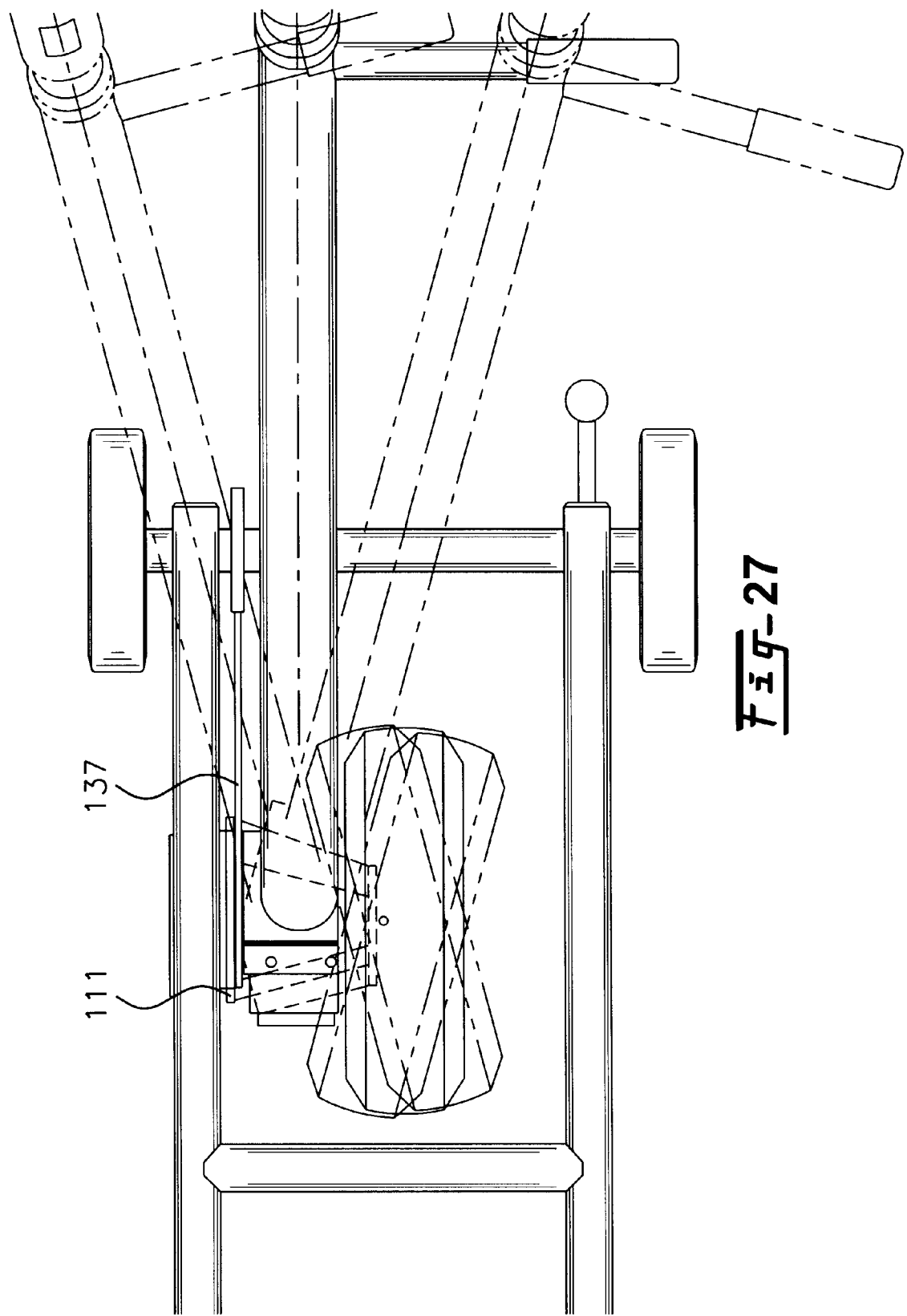

FIG. 26 illustrates a pivotable lock arm 137 for locking said support member to selectively prevent and allow said support member 111 to pivot and turn said drive wheel 27. Lock arm 137 pivots about pivot point 139 and is limited in travel by slot 143, such that notch 145 and pin 147 may engage adaptor plate 111 as shown in FIGS. 27 and 28.

While particular embodiments of the present invention have been illustrated and described, it is not intended to limit the invention, except as defined by the following claims.

What is claimed is:

1. In a tug device for moving small aircraft on the ground and having at least one front wheel, said device including a frame, a handle for connecting a drive wheel for engagement with the ground the drive wheel being thereby driven by a drill having a variable output and connected to said drive wheel by a drive shaft, said frame having an engaging member for attachment to said aircraft, the improvement comprising:

a vertically aligned mounting bracket on said drive wheel positioning said drive wheel for rotation about a vertical axis generally perpendicular to the ground;

support structure on said frame for engaging said mounting bracket and supporting said drive wheel on said frame for angular movement about said vertical axis;

a fastener for engaging said mounting bracket on said drive wheel and said handle for moving said bracket about said vertical axis to thereby turn said drive wheel and permit said device to steer as well as move said aircraft.

2. The device of claim 1, wherein said support structure on said frame includes at least one pin aligned in said vertical axis for engagement with said vertically aligned mounting bracket on said drive wheel.

3. The device of claim 2, wherein said mounting bracket includes at least one opening aligned on said vertical axis and positioned to engage said at least one pin for mounting said drive wheel on said vertical axis.

4. The device of claim 2, wherein said support structure includes a pair of pins aligned in said vertical axis.

5. The device of claim 4, wherein said mounting bracket includes a pair of openings aligned to engage said pair of pins for mounting said drive wheel on said vertical axis.

6. The device of claim 1, which further includes a pivotable lock arm for locking said support member to selectively prevent and allow said support member to pivot and turn said drive wheel.

7. In a tug device for moving small aircraft on the ground and having at least one front wheel, said device including a frame, a handle for connecting a drive wheel for engagement with the ground the drive wheel being thereby driven by a drill having a variable output and connected to said drive wheel by a drive shaft, said frame having an engaging member for attachment to said aircraft, the improvement comprising:
vertically aligned mounting bracket means on said drive wheel for positioning said drive wheel for rotation about a vertical axis generally perpendicular to the ground;
support structure means on said frame for engaging said mounting bracket means and supporting said drive wheel on said frame for angular movement about said vertical axis;
fastener means for engaging said mounting bracket means on said drive wheel and said handle for moving said bracket means about said vertical axis to thereby turn said drive wheel and permit said device to steer as well as move said aircraft.

8. The device of claim 7, wherein said support structure means on said frame includes pin means aligned in said vertical axis for engagement with said vertically aligned mounting bracket means on said drive wheel.

9. The device of claim 8, wherein said mounting bracket means includes at least one opening means aligned on said vertical axis and positioned to engage said pin means for mounting said drive wheel on said vertical axis.

10. The device of claim 9, wherein said pin means includes a pair of pins aligned in said vertical axis.

11. The device of claim 10, wherein said mounting bracket means includes a pair of openings aligned to engage said pair of pins for mounting said drive wheel on said vertical axis.

12. The device of claim 7, which further includes a pivotable lock arm means for locking said support member means to selectively prevent and allow said support member to pivot and turn said drive wheel.

13. A tug device for moving small aircraft on the ground and having at least one front wheel, said device comprising:
a frame;
a drive wheel mounted on said frame for engagement with the ground;
a drill having a variable output;
a handle having a drive shaft connecting said drive wheel to said drill to permit said drill to drive said drive wheel;
an engaging member on said frame for attachment to said aircraft;
a vertically aligned mounting bracket on said drive wheel positioning said drive wheel for rotation about a vertical axis generally perpendicular to the ground;
a support structure on said frame for engaging said mounting bracket and supporting said drive wheel on said frame for angular movement about said vertical axis; and
a fastener for engaging said mounting bracket on said drive wheel and said handle for moving said bracket about said vertical axis to thereby turn said drive wheel and permit said device to steer as well as move said aircraft.

14. The device of claim 13, wherein said support structure on said frame includes at least one pin aligned in said vertical axis for engagement with said vertically aligned mounting bracket on said drive wheel.

15. The device of claim 14, wherein said mounting bracket includes at least one opening aligned on said vertical axis and positioned to engage said at least one pin for mounting said drive wheel on said vertical axis.

16. The device of claim 14, wherein said support structure includes a pair of pins aligned in said vertical axis.

17. The device of claim 14, wherein said mounting bracket includes a pair of openings aligned to engage said pair of pins for mounting said drive wheel on said vertical axis.

18. The device of claim 13, which further includes a pivotable lock arm for locking said support member to selectively prevent and allow said support member to pivot and turn said drive wheel.

19. A tug device for moving small aircraft on the ground and having at least one front wheel, said device comprising:
frame means for supporting said device;
drive wheel means mounted on said frame for engagement with the ground for driving said device;
drill means having a variable output for driving said drive wheel means;
handle and drive shaft means connecting said drive wheel means to said drill means for permitting said drill means to drive said drive wheel means;
engagement means on said frame means for attachment of said device to said aircraft;
vertically aligned mounting bracket means on said drive wheel means for positioning said drive wheel means for rotation about a vertical axis generally perpendicular to the ground;
support structure means on said frame means for engaging said mounting bracket means and supporting said drive wheel means on said frame means for angular movement about said vertical axis; and
fastener means for engaging said mounting bracket means on said drive wheel means and said handle means for moving said bracket means about said vertical axis to thereby turn said drive wheel and permit said device to steer as well as move said aircraft.

20. The device of claim 19, wherein said support structure on said frame includes at least one pin aligned in said vertical axis for engagement with said vertically aligned mounting bracket on said drive wheel.

21. The device of claim 19, wherein said mounting bracket includes at least one opening aligned on said vertical axis and positioned to engage said at least one pin for mounting said drive wheel on said vertical axis.

22. The device of claim 19, wherein said support structure includes a pair of pins aligned in said vertical axis.

23. The device of claim 19, wherein said mounting bracket includes a pair of openings aligned to engage said pair of pins for mounting said drive wheel on said vertical axis.

24. The device of claim 19, which further includes a pivotable lock arm means for locking said support member means to selectively prevent and allow said support member to pivot and turn said drive wheel.

* * * * *